US008908198B2

(12) United States Patent
Flores et al.

(10) Patent No.: US 8,908,198 B2
(45) Date of Patent: Dec. 9, 2014

(54) SYSTEM AND METHOD FOR AUTOMATICALLY RENDERING LABELING SERVICE PRINTS WITH PRINT ENGINE PARAMETERS

(75) Inventors: Eliud Robles Flores, Webster, NY (US);
David B. Montfort, Webster, NY (US);
John R. Falvo, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 814 days.

(21) Appl. No.: 12/947,028

(22) Filed: Nov. 16, 2010

(65) Prior Publication Data
US 2012/0120429 A1    May 17, 2012

(51) Int. Cl.
*G06F 3/12*      (2006.01)
*H04N 1/00*     (2006.01)
*H04N 1/32*     (2006.01)

(52) U.S. Cl.
CPC .......... *G06F 3/1234* (2013.01); *H04N 1/00061* (2013.01); *H04N 1/00037* (2013.01); *H04N 2201/3271* (2013.01); *H04N 1/00015* (2013.01); *H04N 1/0005* (2013.01); *H04N 1/00074* (2013.01); *G06F 3/1281* (2013.01); *G06F 3/121* (2013.01); *H04N 1/00063* (2013.01); *H04N 2201/3266* (2013.01); *G06F 3/1204* (2013.01); *H04N 2201/3222* (2013.01); *H04N 2201/3205* (2013.01); *H04N 1/32133* (2013.01)
USPC .................. 358/1.13; 399/9; 399/10; 399/11; 399/12; 358/406; 358/504

(58) Field of Classification Search
USPC ........... 358/1.13, 1.14, 1.15, 406, 504; 399/9, 399/10, 11, 12
See application file for complete search history.

(56) References Cited

U.S. PATENT DOCUMENTS

| | | | |
|---|---|---|---|
| 5,920,405 A | 7/1999 | McIntyre et al. | 358/442 |
| 6,442,358 B1 | 8/2002 | Regelsberger et al. | 399/85 |
| 7,063,746 B2 | 6/2006 | Russ | 118/324 |
| 7,150,790 B2 | 12/2006 | Russ | 118/324 |
| 7,474,428 B2 | 1/2009 | Morris-Jones et al. | 358/1.15 |
| 7,525,676 B2 | 4/2009 | Pesar | 358/1.13 |
| 7,657,211 B2 * | 2/2010 | Kawai | 399/260 |
| 8,274,678 B2 * | 9/2012 | Ferlitsch et al. | 358/1.15 |
| 2005/0248805 A1 * | 11/2005 | Shima | 358/1.15 |
| 2008/0037048 A1 | 2/2008 | Hopper et al. | 358/1.13 |
| 2009/0237741 A1 * | 9/2009 | Kurahashi | 358/406 |
| 2009/0274342 A1 | 11/2009 | Wu et al. | 382/112 |
| 2010/0110468 A1 | 5/2010 | Nagarajan et al. | 358/1.14 |
| 2011/0228307 A1 * | 9/2011 | Kott et al. | 358/1.14 |

* cited by examiner

*Primary Examiner* — Mark Zimmerman
*Assistant Examiner* — Lawrence Wills
(74) *Attorney, Agent, or Firm* — Kevin Soules; Luis M. Ortiz; Kermit D. Lopez (57) ABSTRACT

A system and method for automatically rendering labeling service prints with print engine parameters. An auto-labeling application can be configured in association with a print engine controller for labeling the service prints with the print engine parameters via a built-in marker integrated with a fault multi-function device. A portable inline marker can also be separately attached to a baffle assembly of the fault device and connected to the print engine controller via a connector in order to receive the print engine parameters from the print engine controller. A setup routine configured with the auto-labeling application can be employed to customize the service print labels in a modular format and the parameters can be appended to each other based on the information required to troubleshoot the fault multi-function device. Such an approach effectively provides labeling of the service prints with enhanced service proficiency and customer satisfaction and reduces service time with respect to the fault multi-function device.

14 Claims, 8 Drawing Sheets

| ENV CONDITIONS | FUSER SETPOINTS | TRANSFER SETPOINTS | CUSTOMER |
|---|---|---|---|
| CAVITY GOW = <br> AMBIENT RH = <br> AMBIENT TEMP = <br> ATTITUDE = | FUSER TEMP <br> RDS STATE = <br> NIP = | TRANSFER A = <br> TRANSFER B = <br> TRANSFER C = <br> DETACT = | NAME = (CONFIDENTIAL) <br> MC # = <br> LOCATION = |
| | | | MEDIA PROPERTIES <br> NAME = <br> WEIGHT = <br> FINISH = <br> THICKNESS = |

| CUSTOMER | MEDIA PROPERTIES | TRANSFER SETPOINTS | FUSER SETPOINTS | ENV CONDITIONS |
|---|---|---|---|---|
| NAME = (CONFIDENTIAL)<br>MC # =<br>LOCATION = | NAME =<br>WEIGHT =<br>FINISH =<br>THICKNESS = | TRANSFER A =<br>TRANSFER B =<br>TRANSFER C =<br>DETACT = | FUSER TEMP =<br>RDS STATE =<br>NIP = | CAVITY GOW =<br>AMBIENT RH =<br>AMBIENT TEMP =<br>ATTITUDE = |

SYSTEM AND METHOD FOR AUTOMATICALLY RENDERING LABELING SERVICE PRINTS WITH PRINT ENGINE PARAMETERS

TECHNICAL FIELD

Embodiments are generally related to rendering devices, such as printers, scanners, multi-function devices, photocopy machines, and the like. Embodiments also relate to inline marker systems and methods. Embodiments are additionally related to auto-labeling techniques.

BACKGROUND OF THE INVENTION

An MFD (Multi-Function Device) is a rendering device or office machine, which incorporates the functionality of multiple devices in one apparatus or system, so as to have a smaller footprint in a home or small business setting, or to provide centralized document management/distribution/production in the context of, for example, a large-office setting. A typical MFD may provide a combination of some or all of the following capabilities: printer, scanner, photocopier, fax machine, e-mail capability, and so forth.

Such multi-function device generally includes one or more troubleshooting artifacts and machine rendering issues, which substantially affects the performance of the device. A service print label (e.g., a text pattern report) including accurate print engine parameter information can be typically delivered to an upper level support (e.g., a customer service engineer) in order to analyze problem with respect to the fault multi-function device. Such service print label can be conventionally provided utilizing a hand labeling approach for communicating the print engine parameter information with respect to the rendering issues in extreme areas, such as, for example, paper path, transfer, fusing, and other environments.

Most prior art approaches for labeling the service print with respect to the performance issues in the rendering device can count on varying personnel, organizations, levels, and/or procedures to escalate the rendering issue to the appropriate service personnel. A downstream marking sub-system such as, for example, a transfer and fusing sub-system can be adapted to provide the error report along with other information for example, banner sheets, email, text, phone messages, handwritten notes, service logs/notes, rumors and the like. Such an approach typically lacks the system controls with respect to the multi-function device. Additionally, transmitting and processing such enormous amounts of data is bandwidth and computationally intensive, time consuming, and generic rather than specific to the immediate usage profile of the MFDs. Furthermore, determining the root causes for such difficult problems is an extremely challenging task. The service personnel may also require additional onsite visits, phone calls, and emails in order to understand the rendering issue and results in a negative impact with respect to the customer satisfaction.

Based on the foregoing, it is believed that a need exists for an improved system and method for automatically rendering labeling service prints with print engine parameters, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved system and method rendering labeling service prints with print engine parameter.

It is another aspect of the disclosed embodiments to provide for an improved auto-labeling approach.

It is a further aspect of the disclosed embodiments to provide for an improved method for automatically labeling the service prints with print engine parameter utilizing an in-line marker.

The aforementioned aspects and other objectives and advantages can now be achieved as described herein. A system and method for automatically rendering labeling service prints with print engine parameters is disclosed herein. An auto-labeling application can be configured in association with a print engine controller for labeling the service prints with the print engine parameters via a built-in marker integrated with a fault multi-function device (i.e., note that the print engine itself, and no additional device, labels its own prints as it prints a job). A portable inline marker can be separately attached to a baffle assembly of the fault device and connected to the print engine controller via a connector (e.g., a wired and/or wireless connector) in order to receive the print engine parameters from the print engine controller.

Additionally, a setup routine configured with the auto-labeling application can be employed to customize the service print labels in a modular format (e.g., a square module, a linear module and an L-shaped module) and the parameters can be appended to each other based on the information required to troubleshoot the fault multi-function device. Such an approach effectively provides labeling of the service prints with enhanced service proficiency and customer satisfaction and reduces service time with respect to the fault multi-function device.

The in-line marker can be attached to the baffle assembly of the multi-function device in a quick connect fashion. The baffle assembly can be located prior to an output unit of the fault multi-function device in order to provide a cost-effective sharing of the portable in-line marker among the multi-function devices. The power supply with respect to the marker can be provided via the fault multi-function device and/or the connector. The auto-labeling application configured in association with the software diagnostic routine of the controller can communicate the standard and/or custom parameters with respect to the marker.

The service print labels with respect to the fault multi-function device can be enabled in a diagnostic mode and can be made available in an operating mode. The auto-labeling application can customize the print label information (e.g., label content, location and other properties) based on a feedback of an upper level support and/or a pre-arranged standard operating procedure. The service print label can be configured to include various subsystem set points that are critical to troubleshooting. The service print label having the print engine parameters can be represented as a bar code and/or a human readable format. Such a system and method can be adapted for effectively troubleshooting the rendering issues and eliminating the uncertainties with respect to the media properties, set points and machine conditions in the fault multi-function device.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
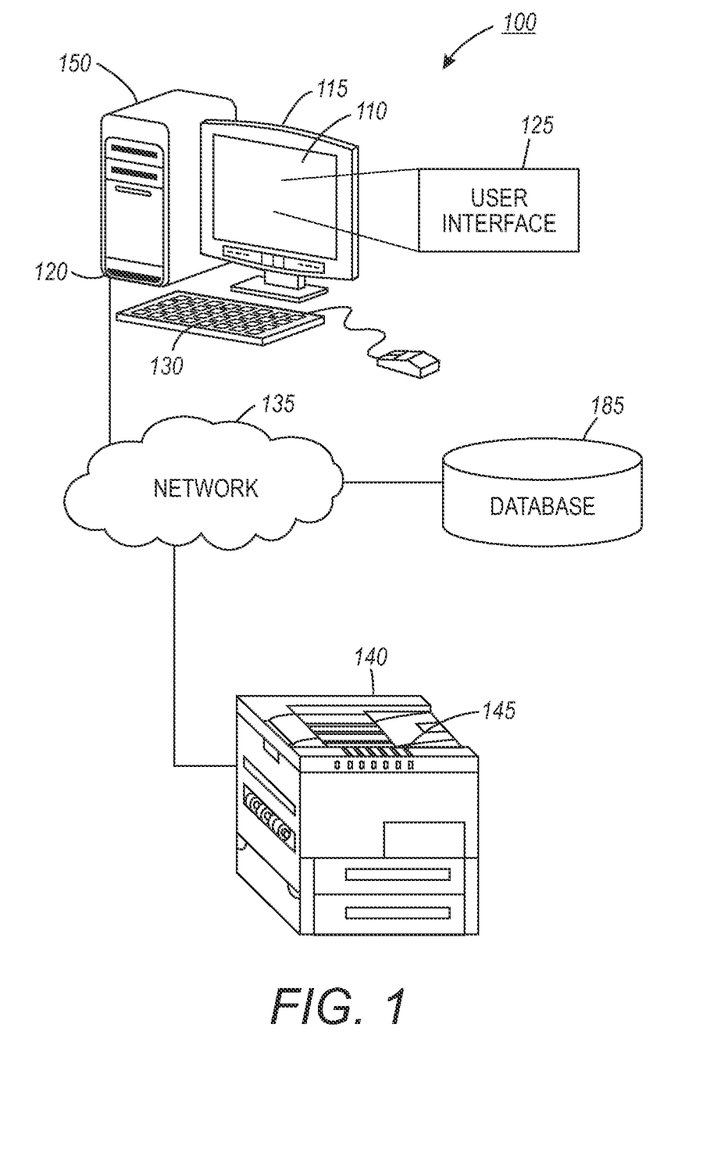
FIG. 1 illustrates an example of a multi-function device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes an MFD 140 coupled to a data-processing apparatus 110 through a network 135. The data-processing apparatus 110 may be, for example, a personal computer or other computing device, and generally includes a central processor 120, a display device 115, a keyboard 130, and a pointing device (e.g., mouse, track ball, pen device, or the like). Additional input/output devices, such as the multi-function device 140 may be included in association with the data-processing apparatus 110 as desired. The system 100 also includes a database 185 for storing information with respect to the data-processing system 100 and the MFD 140 within the network 135.

Figure 2:
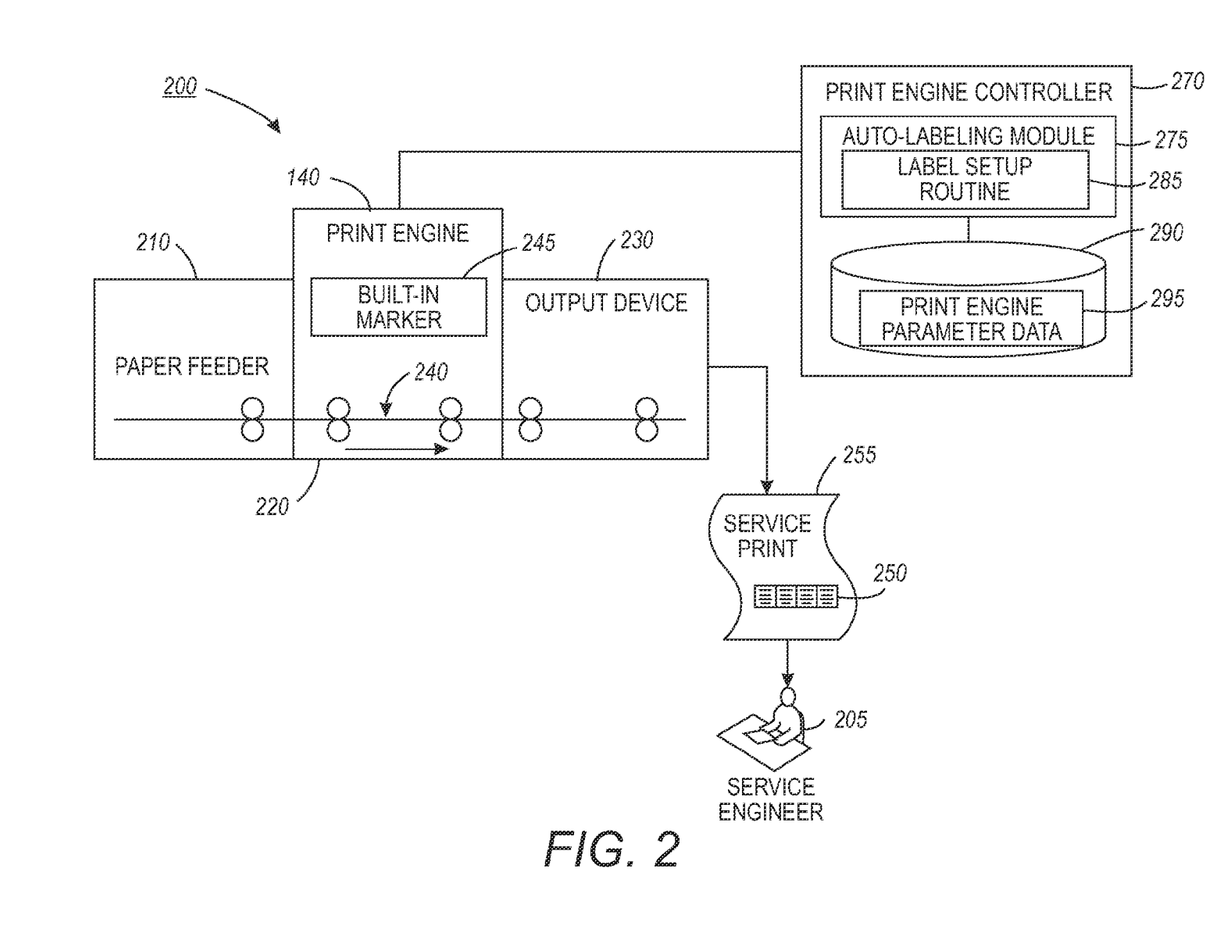
FIG. 2 illustrates a block diagram of an auto-labeling system having a built-in marker for labeling service rendering, in accordance with the disclosed embodiments.

Note that as utilized herein, the term multi-function device (including the acronym MFD) may refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 may be implemented with a single rendering function such as printing. In other embodiments, MFD 140 can be configured to provide multiple rendering functions, such as scanning, faxing, printing and copying. Note that the MFD 142 described in greater detail herein is analogous or similar to MFD 140. In a preferred embodiment, the MFD 140/142 (printer rendition) is the print engine described herein, which in turn is the built-in marker 245. That is, in a preferred embodiment, these components are all the same device.

A non-limiting example of an MFD that can be utilized as MFD 140 is disclosed in U.S. Pat. No. 7,525,676, entitled "System and Method for Controlling Access to Programming Options of a Multi-function device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD 140 is disclosed in U.S. Pat. No. 7,474,428, entitled "Multi-function device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as MFD 140 is disclosed in U.S. Pat. No. 5,920,405, entitled "Multi-function device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the MFD 140 through a computer network 135. Network 135 may employ any network topology, transmission medium, or network protocol. Network 135 may include connections, such as wire, wireless communication links, or fiber optic cables. The MFD 140 includes a user interface 145, such as a panel menu. The panel menu may be used to select features and enter other data in the MFD 140. Such interfaces may include, for example, touch screens having touch activated keys for navigating through an option menu or the like.

A MFD driver program can be installed on the data-processing apparatus 110 and can reside on the host device's hard drive 150. The MFD driver program may be activated through an application interface so that a user may generate a print job with the MFD driver for processing by the MFD 140. The data-processing apparatus 110 also includes a GUI 125 for communicating MFD features for processing, for example, a print job to a user and accepting the user's selection of available MFD features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

The following description is presented with respect to embodiments of the present invention, which can be embodied in the context of a data-processing apparatus 110 and MFD 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

FIG. 2 illustrates a block diagram of an auto-labeling system 200 having a built-in marker 245, in accordance with the disclosed embodiments. Note that in FIGS. 1-8, identical or similar blocks are generally indicated by identical reference numerals. In the configuration shown in FIG. 2, the built-in marker 245 is not a separate module but the print engine 140 itself. In general, the system auto-labeling system 200 communicates with a print engine controller 270.

The auto-labeling system 200 includes a fault multi-function device 140 that is operatively configured with the print engine controller 270 in order to render a service print label 250 with respect to the fault multi-function device 140. The fault multi-function device 140 further includes a paper feeder 210, a print engine 220, the built-in marker 245 and an output unit 230 that are configured with respect to a paper path 240 in the fault multi-function device 140.

The multi-function device 140 is an office machine which incorporates the functionality of multiple devices in one, so as to provide centralized document management, document distribution and production in a large-office setting and the like. The typical rendering device may act as a combination of a printer, scanner, photocopier, fax and e-mail. While single multi-function device 140 is shown by way of example, it is to be appreciated that any number of rendering devices may be linked to the network, such as three, four, six or more rendering devices. In general, the multi-function device 140 can be employed to perform a rendering output function (e.g., printing, scanning, copying, faxing, etc) within a networked environment.

A fault is an abnormal state with respect to the multi-function device 140, including dysfunction of a part, an assembly, or the whole system. The occurrence of the fault is associated with a number of factors, which in turn is related to a number of symptoms. Fault diagnostics is the study of the relationship of fault, factors and symptoms, and it is utilized to predict and control the performance of a system, such as, for example, a telecommunication system, a xerographic system and so forth.

The print engine controller 270 can be configured in some embodiments with an auto-labeling application module 275 for providing labeling, for example, with respect to the service print 255 in the multi-function device 140. Note that as utilized herein, the term "module" may refer to a physical hardware component and/or to a software module. In the computer programming arts, such a software "module" may be implemented, for example, as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as USB drives, Flash memory, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

The auto-labeling application module 275 of the print engine controller 270 interacts with a database 290 in order to access one or more print engine parameter data 295 with respect to the fault multi-function device 140. The auto-labeling application module 275 further includes a setup routine 285 to customize the print label 250 in a modular format such as, a module and/or a square format and communicate the print engine parameters 295 to the built-in marker 245. The print controller 270 operating in conjunction with the database 290 provides operating control with respect to the fault multi-function device 140. The print controller 270 can be an external device such as a data processing system 100 and/or a server, which accepts print data parameters with respect to the fault multi-function device 140. The print controller 270 can be also configured as a part of the fault multi-function device 140 in order to receive data that can be rendered on the service print 255. The print controller 270 typically "interprets" and/or "decomposes" the parameter data into a format usable by the multi-function device 140.

Figure 3:
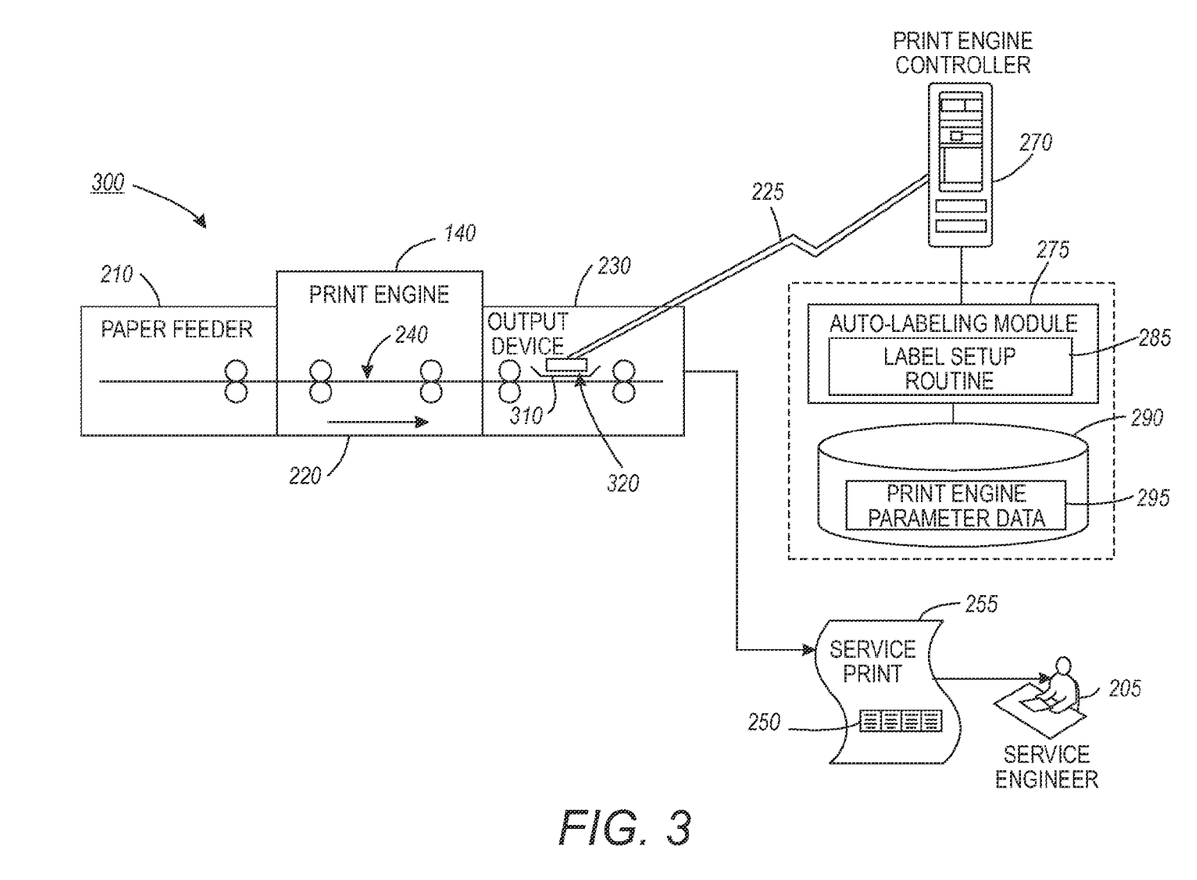
FIG. 3 illustrates a block diagram of an auto-labeling system having a portable in-line marker for labeling service prints, in accordance with the disclosed embodiments.

FIG. 3 illustrates a block diagram of the auto-labeling system 300 configured with a portable in-line marker 320, in accordance with the disclosed embodiments. The integrated in-line marker 320 can be a portable device employed for escalating varying computation and performance based issues with respect to a fault multi-function device 140 to an upper level support 205. Note that the upper level support 205 can include, for example, CSE (Customer Service Engineering) personnel. The portable in-line marker 320 can be a print head that is communicated with the print engine controller 270 via a connector 225.

The portable marker 320 can be operatively attached to a baffle assembly 310 located at the paper path 240 of the fault multi-function device 140 for labeling the service print 255 in the fault multi-function device 140. The portable marker 240 connects the baffle assembly 310 of the fault multi-function device 140 in a quick connect fashion. The baffle assembly 310 can be located prior to the output unit 230 of the fault multi-function device 140 in order to provide cost-effective sharing of the portable marker 320 among the fault multi-function devices 140. The power supply with respect to the portable marker 320 is provided via the fault multi-function device 140 and/or the connector 225.

The auto-labeling application module 275 further includes a setup routine 285 to customize the print label 250 in a modular format such as a module and/or a square format and communicates the print engine parameters 295 to the portable marker 320 via the connector 225. The connector 225 integrates the portable marker 320 with the print engine controller 270 in order to receive the print engine parameter data 295 from the print engine controller 270. Note that the connector 225 can be a wired connection and/or a wireless communication such as Bluetooth technology.

The auto-labeling application module 275 can be configured as a specific part of the software diagnostic routines in the print engine controller 270 for communicating the standard and/or custom parameters 295 such as a specific subsystem data with respect to the system 300. For example, in an iGen printer, if the rendering issue is related to a toner to paper transfer subsystem, the auto-labeling system 300 can render subsystem data such as, for example, transfer and detach current levels, pre-transfer grid voltage levels, transfer overdrive configuration, and transfer assist blade step timing and levels onto the service print 255. The subsystem data can be rendered within an area of the print selected by the upper level support 205. The area of the print with respect to the service print 255 can be a lead edge, a trail edge area, a center area and/or inboard/outboard, etc.

The service prints 255 generated by the portable marker 320 can be illegible on the fault multi-function device 140 due to varying issues such as black image, black print head text, and barcode issues. It is therefore the area of the print with respect to the service print 255 can be selected on a lighter part of the document/customer file. Laser print head may be optionally employed to etch over the service print 255 in order to achieve clear contrast in the service print 255. The print engine controller 270 further customizes label information such as label content and location with respect to the service print 255 based on a feedback of the upper level support 205 and/or a pre-arranged standard operating procedure. The print conditions and data that are stored in a module with respect to the print label 250 can be further appended to each other based on the required parameter information for solving the issues in the fault multi-function device 140. Such print labels 250 with respect to the service print 255 can be represented as a bar code and/or in a human readable format with respect to the upper level support 205.

Figure 4:
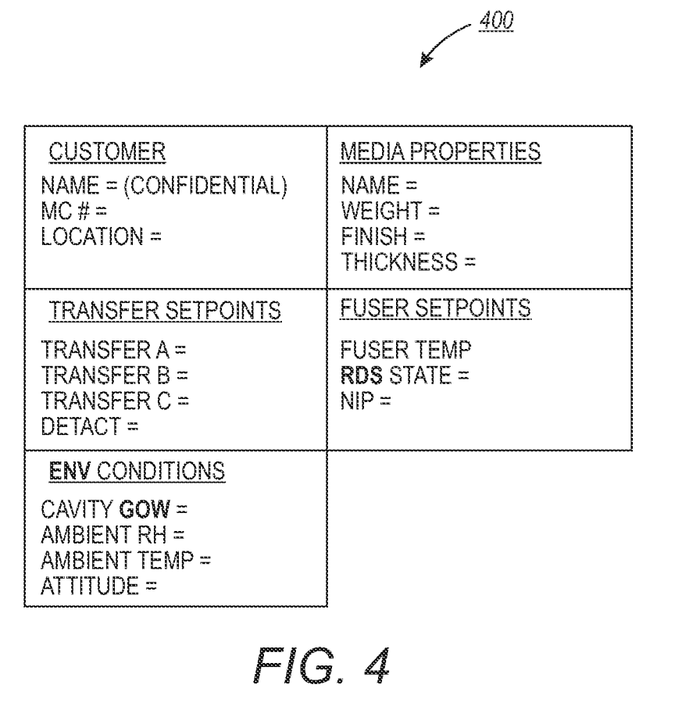
FIGS. 4-6 illustrate service print label modules with critical print conditions, in accordance with the disclosed embodiments.
Figure 5:
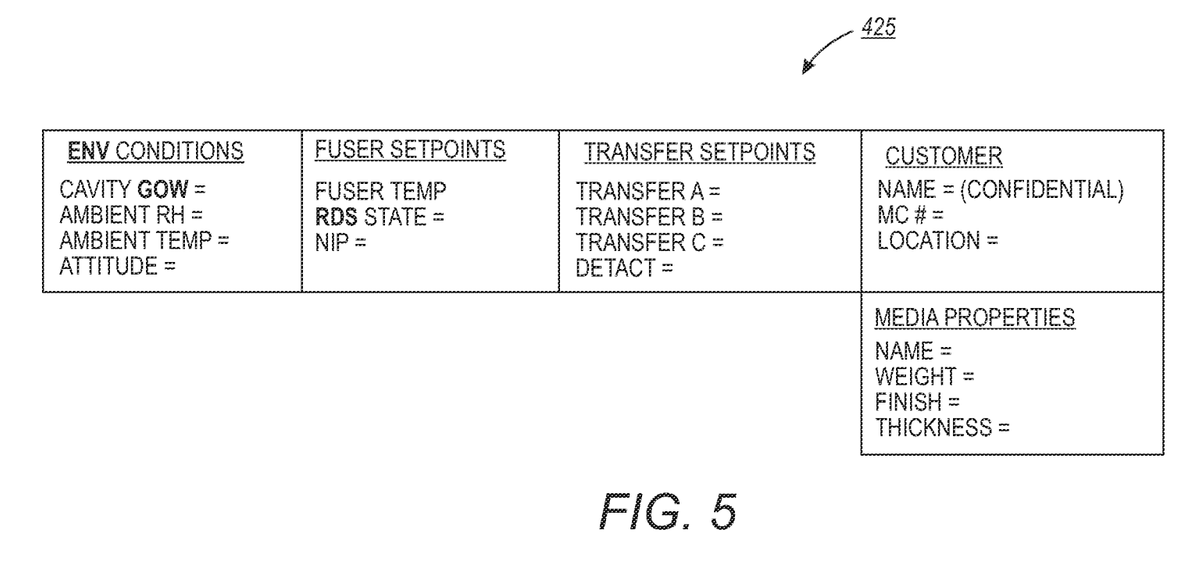
Figure 6:
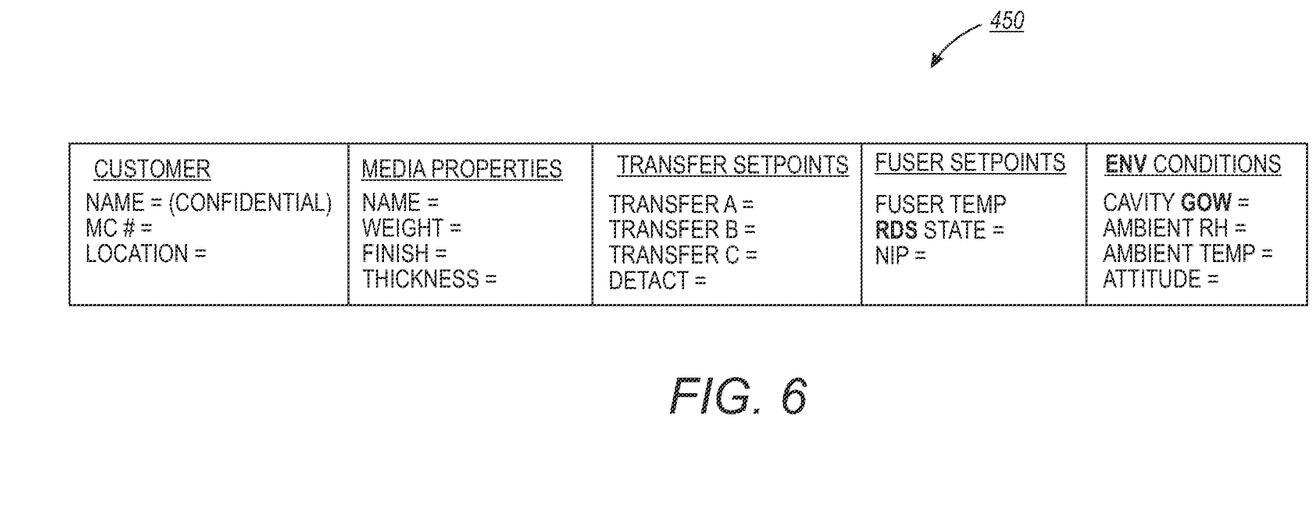

FIGS. 4-6 illustrate service print label modules 400, 425 and 450 with critical print conditions, in accordance with the disclosed embodiments. The print labels 250 can be represented in various shapes such as a square shaped print label 400, an L-shape print label 425 and a linear shaped print label 450 with respect to the service print 255 in the fault multi-function device 140. The auto-labeling system 300 utilizes the fault multi-function device 140 and/or the portable in-line marker 320 to label the service print 255 with critical print conditions such as media name, media type, and Side 1 Vs Side 2, etc. Such labels 400, 425 and 450 also include various subsystem set points that are critical for troubleshooting the fault multi-function device 140 in a wide range of interactive applications such as paper path, transfer, fusing, and other environments.

FIG. 4 illustrates the square shaped print label 400, in accordance with the disclosed embodiments. The print conditions with respect to the service print 255 can be represented utilizing a square shaped modular format in order to facilitate the service personnel to recognize and respond to the rendering issues in the fault multi-function device 140. FIG. 5 illustrates the L-shaped print label 425, in accordance with the disclosed embodiments. The print conditions with respect to the service print 255 are represented utilizing the L-shaped modular format in order to facilitate the service personnel to recognize and respond to the rendering issues in the fault multi-function device 140.

FIG. 6 illustrates the linear shaped print label 450, in accordance with the disclosed embodiments. The print conditions with respect to the service print 255 can be represented utilizing a planar shaped modular format in order to facilitate the service personnel to recognize and respond to the rendering issues in the fault multi-function device 140. The print labels 400, 425 and 450 are default in a diagnostic mode and available in an operating mode. Such print labels 400, 425 and 450 can be retrieved via a remote memory location (RML), stock library and a non-volatile memory (NVM) for troubleshooting the rendering issues and eliminating the uncertainties with respect to the media properties, set points and machine conditions in the fault multi-function device 140.

Figure 7:
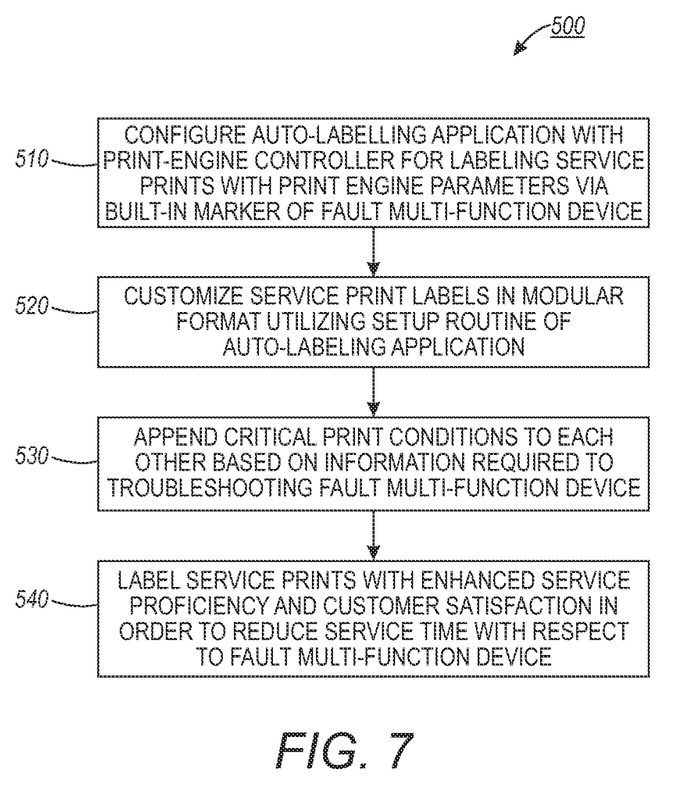
FIG. 7 illustrates a high level flow chart of operations illustrating logical operational steps of method for auto-labeling the service prints with print engine parameter utilizing the built-in marker, in accordance with the disclosed embodiments.

FIG. 7 illustrates a high level flow chart of operations illustrating logical operational steps of method 500 for auto-labeling the service print 255 with the print engine parameters 295 utilizing the built-in marker 245 of the fault multi-function device 140, in accordance with the disclosed embodiments. Note that the method 500 can be implemented in the context of a computer-useable medium that contains a program product, including, for example, a module or group of modules. The auto-labeling application module 275 can be configured in association with the print engine controller 270 for labeling the service prints 255 with the print engine parameters having various subsystem set points via the built-in marker 245 of the fault multi-function device 140, as illustrated at block 510.

The setup routine 285 configured with the auto-labeling application module 275 can be employed to customize the service print labels 250 in the modular format, as depicted at block 520. The critical print conditions can be appended to each other based on the information required to troubleshooting the fault multi-function device 140, as depicted at block 530. The service prints 255 can be therefore effectively labeled with enhanced service proficiency and customer satisfaction and reduces service time with respect to the fault multi-function device 140, as illustrated at block 540.

Figure 8:
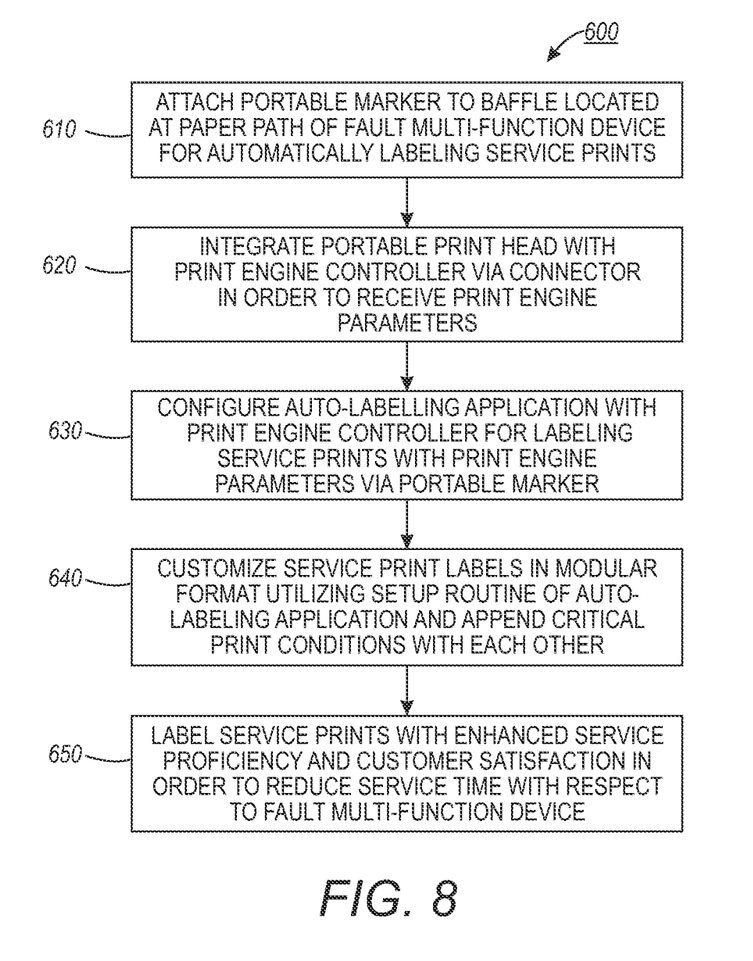
FIG. 8 illustrates a high level flow chart of operations illustrating logical operational steps of a method for auto-labeling a service print with print engine parameter utilizing the in-line marker, in accordance with the disclosed embodiments.

FIG. 8 illustrates a high level flow chart of operations illustrating logical operational steps of method 600 for auto-labeling the service print 255 with the print engine parameters 295 utilizing the portable in-line marker 320 of the fault multi-function device 140, in accordance with the disclosed embodiments. The portable marker 320 can be attached to the baffle assembly 310 located at the paper path 240 of the fault multi-function device 140 for automatically labeling the service prints 255, as illustrated at block 610. The portable marker 320 can be communicatively integrated with the print engine controller 270 via the connector 225 in order to receive the print engine parameters 295 at the portable marker 320, as depicted at block 620.

The auto-labeling application module 275 of the print engine controller 270 can be configured to include the setup routine 285 in order to customize the print label 250 in the modular format, as depicted at block 630. The print engine parameters 295 can be further communicated to the portable marker 320 via the connector 225, as illustrated at block 640. The service prints 255 can be thereafter labeled with the print engine parameters 295 utilizing the marker 320 in order to facilitate the upper level support 205 to identify the rendering issues in the fault multi-function device 140, as depicted at block 650.

The auto-labeling system 200 effectively provides the service print labels in the fault multi-function device by eliminating miscommunication and confusions with respect to the upper level support team. Such an auto-labeling system 200 can be adapted for effectively troubleshooting the rendering issues and eliminating the uncertainties with respect to the media properties, set points and machine conditions in the fault multi-function device. Such system and method therefore effectively provides labeling of the service prints with enhanced service proficiency and customer satisfaction and reduces service time with respect to the fault multi-function device.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically rendering labeling service prints, said method comprising:

configuring an auto-labeling application in association with a print engine controller in order to label a service print with a print service label wherein said print service label comprises at least one print engine parameter and said print service label is printed via a marker associated with a fault multi-function device;

customizing said service print label in a modular format utilizing a setup routine configured with said auto-labeling application in order to thereafter append said at least one print engine parameter with respect to said service print label based on information required to troubleshoot said fault multi-function device; and labeling said service print with said at least one print engine parameter via a portable inline marker separately attached to a baffle assembly of said fault multi-function device.

2. The method of claim 1 further comprising labeling said service print with said print service label comprising said at least one print engine parameter with a built-in marker associated with said fault multifunction device.

3. The method of claim 1 further comprising configuring said module to comprise at least one of the following types of shapes: a square module; and an L-shaped module.

4. The method of claim 1 further comprising representing said at least one print engine parameter as a bar code with respect to said service print label and representing said at least one print engine parameter in a human readable format with respect to said service print label.

5. The method of claim 1 further comprising configuring said service print label to include a plurality of subsystem set points that are critical to troubleshooting where said plurality of subsystem set points comprise: paper path set points, transfer set points, and fusing set points.

6. The method of claim 1 further comprising setting said service print label as default in a diagnostic mode and available in an operating mode.

7. The method of claim 1 further comprising: separately attaching said portable inline marker to said baffle assembly located at or proximate to a paper path of said fault multi-function device; and integrating said portable in-line marker with said print engine controller via a connector to receive said at least one print engine parameter from said controller.

8. The method of claim 1 further comprising connecting said portable in-line marker with said baffle in a quick connect fashion.

9. The method of claim 1 further comprising locating said baffle assembly next to an output unit of said multi-function device in order to provide a cost-effective sharing of said portable in-line marker among a plurality of multi-function devices.

10. The method of claim 1 further comprising transmitting said at least one parameters with respect to said portable marker utilizing said setup routine configured in association with said auto-labeling application.

11. The method of claim 7 wherein said connector comprises a wired connection.

12. The method of claim 7 wherein said connector comprises a wireless connection.

13. The method of claim 1 wherein said portable inline marker comprises a print head.

14. A system for automatically rendering labeling service prints, said system comprising:
   a processor;
   a data bus coupled to said processor; and
   a computer-usable medium embodying computer code, said computer-usable medium being coupled to said data bus, said computer program code comprising instructions executable by said processor and configured for:
      configuring an auto-labeling application in association with a print engine controller in order to label a service print with a print service label wherein said print service label comprises at least one print engine parameter and said print service label is printed via a marker associated with a fault multi-function device;
      customizing said service print label in a modular format utilizing a setup routine configured with said auto-labeling application in order to thereafter append said at least one print engine parameter with respect to said service print label based on information required to troubleshoot said fault multi-function device; and
      labeling said service print with said at least one print engine parameter via a portable inline marker separately attached to a baffle assembly of said fault multi-function device.

* * * * *